United States Patent
Samartina

[15] 3,684,319
[45] Aug. 15, 1972

[54] HOSE END COUPLING

[72] Inventor: Anthony John Samartina, Wallington, N.J.

[73] Assignee: Tasco Engineering & Supply, Inc., Tenafly, N.J.

[22] Filed: May 27, 1970

[21] Appl. No.: 40,842

[52] U.S. Cl. ............................... 285/247, 285/246
[51] Int. Cl. ............................................. F16l 21/08
[58] Field of Search ................ 285/39, 246, 247, 251

[56] References Cited

UNITED STATES PATENTS

| | | | |
|---|---|---|---|
| 2,333,350 | 11/1943 | Weatherhead, Jr. | 285/251 |
| 1,339,620 | 5/1920 | Hart | 285/247 X |
| 1,233,401 | 7/1917 | Reeve | 285/247 |
| 2,697,620 | 12/1954 | Margrave | 285/247 X |

FOREIGN PATENTS OR APPLICATIONS

| | | | |
|---|---|---|---|
| 254,903 | 1/1948 | Switzerland | 285/251 |

*Primary Examiner*—Andrew V. Kundrat
*Attorney*—Curtis, Morris & Safford

[57] ABSTRACT

A nipple and collar for hose couplings are shown. The nipple includes a conventional taper for easing its entry into a hose end, a length of hose contacting surface adjacent to the taper, a threaded length and an annular ring having a diameter greater than the threads. The annular ring is positioned behind the threads and by abutting the collar limits the distance to which the threads can be advanced through the mating collar. The threads on the nipple do not contact the hose. The annular ring also controls and standardizes the gap between the collar and a swivel nut rotatably mounted on a platform at the rear of the nipple. It is preferably of sufficient diameter to abut the collar but small enough to allow the swivel nut to pass over it during assembly. The collar has annular ribs which grip the hose end and a female threaded length which mates with the thread on the nipple. The threaded length in the collar and the threaded length of the nipple are approximately the same. With hose end couplings as shown, the hose is not cut or damaged or weakened in any way, burrs or rubber particles are not kicked up, assembly and disassembly of the coupling is simplified and made more exact and tighter couplings are obtained than with conventional designs. The coupling may be of the permanent or reusable type.

2 Claims, 3 Drawing Figures

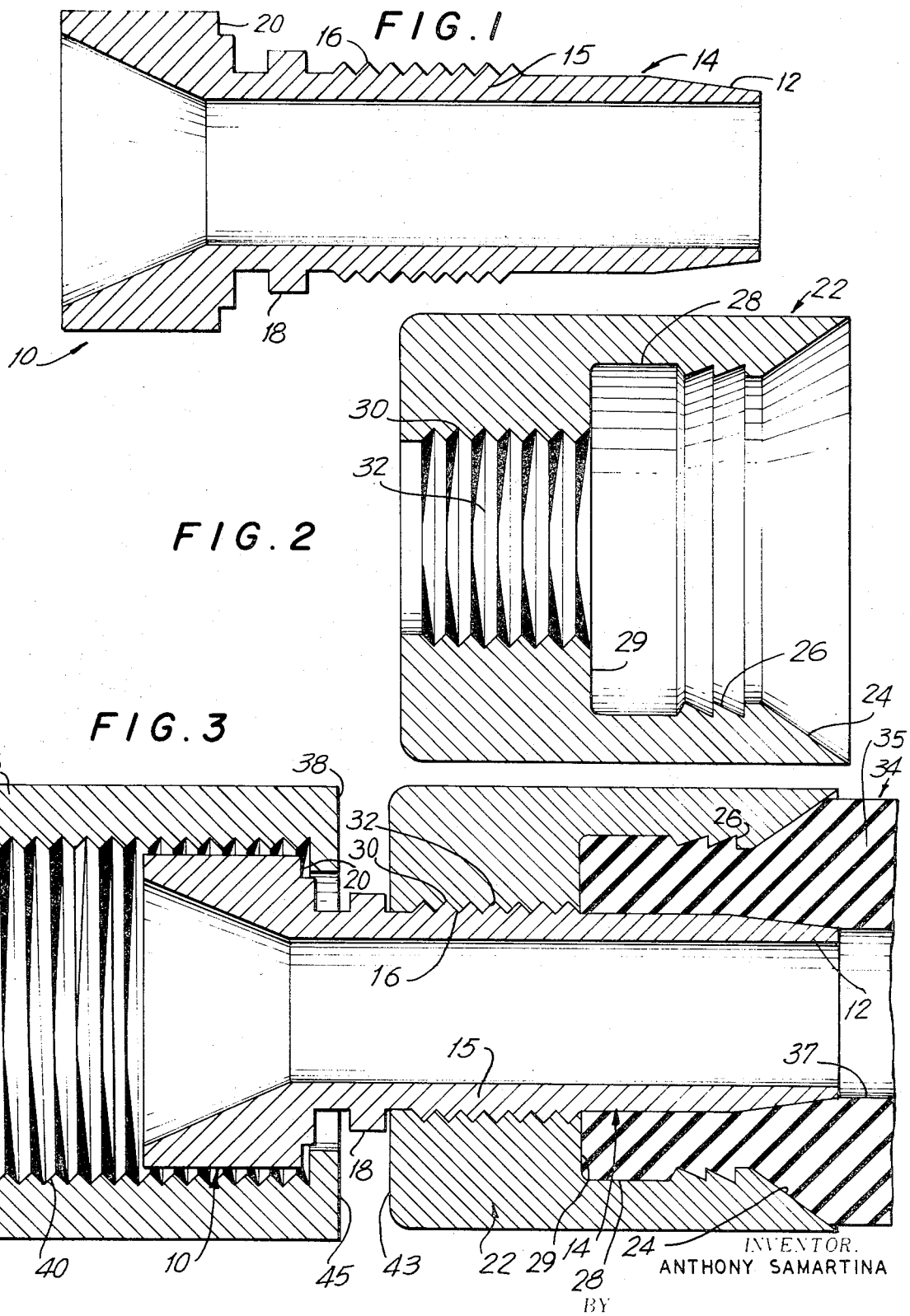

HOSE END COUPLING

This invention relates to a hose end coupling. More specifically, this invention relates to a hose end coupling comprising a nipple and a collar which may be field assembled and disassembled and reused many times. Even more specifically, this invention relates to a reusable hose end coupling having a swivel nut attachment.

Conventional hose end couplings are typically comprised of a nipple, a collar fitting snugly over the hose end and having a female threaded length which mates with threads on the nipple, and a swivel nut freely rotatable about the axis of the nipple and retained thereon by means of an annular platform. The coupling is assembled by first placing the collar on the hose end and forcing the hose end therein until its end surface bottoms on the annular shoulder of the collar. The nipple is then introduced through the threaded female section of the collar and screwed into the hose. The leading part of the nipple includes a taper whose diameter is slightly smaller than the inside diameter of the hose being coupled in order to ease entry of the nipple into the hose. The nipple then enters the hose and the threads cut into the inner lining thereof. In some nipples the initial threads are tapered half threads in order to facilitate the engaging of the nipple in the inner surface of the hose and in some nipples, the initial threads are full threads; in either case they cut into the hose during assembly and help secure the nipple to the hose.

The disadvantages of conventional nipple and collar assemblies wherein the nipple is threadedly engaged into the positioned hose end, are manifold. Cutting the inner wall of the hose with the nipple threads inevitably results in a weakened inner wall. Since hoses generally include an inner liner of leak proof flexible material such as a natural or synthetic rubber which is reinforced against internal pressures by one or more braided sleeves and protected by an outer fabric cover, it is only the inner liner which provides a pressure tight conduit for the fluid. Where the hose is in pressure service, any cut into the surface may weaken the hose, shorten its effective life and perhaps result in hose failure.

A further disadvantage of a direct threaded engagement of nipple to hose is the cutting action caused by these threads on the rubber liner. Bits and pieces of rubber, burrs, are cut out. Unless these are purged from the hose they will obstruct the hose and contaminate the matter subsequently flowing through it and they may interfere with the normal operation of the equipment serviced by the hose. Accordingly it is necessary in conventional systems to first purge the coupled hose in order to flush out the burrs of rubber which have been formed during the assembly of the coupling.

Still a further inherent disadvantage in conventional hose coupling techniques stems from the necessity of using a suitable lubricant to reduce the metal to rubber friction and to cool the hose end during the cutting-threading of the nipple into the hose end. Since the threads entering into the collar are acting as the primary pulling forces during assembly, it is necessary to liberally lubricate the metal and rubber surfaces so that binding and distortion of the hose end do not occur. The lubricant also must be cleaned out after assembly. Heat generation in the threading operation is substantial and the lubricant serves to reduce the heat created.

Further disadvantages are encountered in conventional hose end coupling assemblies wherein the initial threads on the nipple are partial threads. The partial threads have a tendency to strip when acting as the primary pulling force during initial assembly. Still further disadvantage in conventional hose couplings derives from the inexactness with which the couplings are assembled. Where the nipple has a swivel nut attachment, for example, the nipple is advanced into the collar end until the separation of the collar and the swivel nut appears to be correct. The proper separation of collar and swivel nut is usually judged by eye. If the nipple is advanced too far into the hose, however, the swivel nut will be close to or in contact with the end of the collar and its free rotation will be prevented. In the worst case a locked fitting results. This locking condition can be corrected by backing the nipple out of the collar. Reversing of the assembly operation can result, however, in a poor connection of the nipple to the hose. Alternatively, if the nipple is not advanced far enough into the hose, and particularly where its initial threads are partial threads, a weak and sloppy coupling results.

In the latter case, the fitting may not withstand service pressures of meet service life expectations. In assembling hose fittings where machine power is utilized, eye-gauging of the proper distance between collar and swivel nut necessitates that caution be used by the operator to prevent a locked assembly. When a locked assembly is encountered the operator must reverse the drive one or more times in order to establish proper separation. This, of course, is extremely wasteful in man and machine time. Still another disadvantage encountered with conventional couplings includes frequent stripping of the partial nipple threads when entering the collar and also when the nipple is advanced too far into the hose. The nipple may break or distort, in which case the assembly is discarded.

It is thus the primary object of this invention to provide a nipple for hose couplings and a nipple and collar assembly whereby the substantial disadvantages of conventional couplings are avoided.

It is a further object of this invention to provide a hose coupling including a nipple and a collar which do not damage the hose by cutting threads into it, do not contaminate the conduit and do not require liberal amounts of lubricant.

It is still a further object of this invention to provide a nipple and collar which take the guesswork out of the assembling of the hose coupling by automatically gauging the advance of the nipple into the hose and automatically stopping that advance when proper assembly is achieved.

It is a related and further object of this invention to automatically set the gap between the collar and the swivel nut on the nipple thereby preventing locked fittings, stripped threads, inefficiencies in assembling the hose coupling and sloppy couplings.

These and other objects of this invention are achieved with a nipple having a smooth external taper at the end which enters the hose, a length adjacent thereto having an external surface which is smooth and firmly presses against the inside surface of the hose, a threaded length, and a step behind the threaded length and remote from the front end of the nipple having a diameter greater than the thread. In the preferred embodiment, the step is an annular ring on the nipple. It acts as an automatic stop on the advance of the nipple into the hose by abutting the collar when the nipple threads are fully advanced. The annular ring may be provided with suitable means, including a plurality of flat surfaces, to be gripped by a torque producing tool. The nipple of this invention may include an annular platform at its end remote from the taper adapted to retain a swivel nut. The swivel nut has an inside diameter greater than the diameter of the annular ring, thereby allowing it to pass over the ring. Alternatively the nipple may be provided with suitable means for connecting it to other hose or pipe fittings.

The invention further includes a nipple as described above in combination with a hose collar. The hose collar has means, such as ribs, which firmly grip the exterior of the hose to be coupled and firmly position the end surface thereof against an interior annular shoulder of the collar. The collar further includes a female threaded length whose threads mate with the threads on the nipple. In assembling the coupling, the hose is securely inserted in the collar. The nipple is then positioned into the hose end through the female threaded part of the collar and its threads engage those of the collar. The annular ring on the nipple behind the threads limits the advance of the nipple into the hose by abutting the collar when all the threads on the nipple have advanced into the collar. A tight coupling is obtained by virtue of the pressure on the hose created between the collar and a constant diameter, smooth length of the nipple. The number of threads on the nipple is approximately or exactly equal to the number of threads in the collar so that full engagement of nipple and collar is achieved. There is no contact however between the threads and the hose. The annular ring, or auto stop, in precisely controlling the distance to which the nipple is advanced, thereby precisely controls the gap between the collar and the swivel nut which is rotatably mounted on a platform at the end of the nipple. Preferably the annular ring is large enough in diameter to abut the collar but small enough to permit passage over it of the swivel nut.

IN THE DRAWINGS

FIG. 1 is a section view of the nipple of this invention;

FIG. 2 is a section view of the collar; and

FIG. 3 is a section view of an assembled hose coupling.

FIG. 1, reference numeral 10 refers generally to a nipple which may be made of ferrous or non-ferrous metal. Reference numeral 12 refers to a taper which facilitates entry of the nipple into the hose end and reference numeral 14 refers to a length of nipple having a constant external diameter. Reference numeral 15 refers to a threaded length having full threads 16. Reference numeral 18 refers to an integral annular ring located adjacent to threaded length 15. Annular ring 18 has an external diameter greater than that of threads 16 and limits their advance into the female threaded section of the collar. Reference numeral 20 refers to a platform for a swivel nut.

In FIG. 2 reference numeral 22 refers to a collar of generally annular design. Reference numeral 24 refers to a tapered end section or guide zone which facilitates introduction of the hose end into the collar. Reference numeral 26 refers to ribs which grip the external surface of the hose and hold it firmly in position and reference numeral 28 refers to a receiving pocket into which the hose end expands. Numeral 29 refers to an annular shoulder against which the hose end firmly abuts. Collar 22 has female threaded length 30 and threads 32 which mate with threads 16 on nipple 10.

In FIG. 3, reference numeral 34 refers to a hose having external surface 35 and internal surface 37. Reference numeral 36 refers to a swivel nut having a flange 38 which is rotatably retained by platform 20 of nipple 10. Swivel nut 36 includes threads 40 which threadedly engage any suitable pipe fitting.

In assembling the hose coupling of this invention, hose 34 is introduced into collar 22 via tapered end section 24 and is forced into receiving pocket 28 with its end abutting shoulder 29. Ribs 26 hold the hose securely within collar 22. Swivel nut 36 is then passed over the leading end of nipple 10 and is positioned onto platform 20. Nipple 10 is then positioned in female threaded length 30 of collar 22 and tapered end 12 thereof enters hose 34. With a suitable amount of hand or implement pressure nipple 10 advances into hose 34 and threads 16 engage threads 32 in collar 22. Rotation of nipple 10 will then advance it into hose 34 as is shown in FIG. 3. The hose and collar are fixed by means of a holding tool applied to collar 22 which desirably has flat external surfaces for that purpose. As nipple 10 advances into hose 34 there is no contact of the inner surface of hose 34 with the threads 16 of the nipple. Consequently, there is no cutting action, no weakening or stressing of the inner surface and no contamination of the conduit with burrs of rubber. The friction developed between length 14 of nipple 10 and inner surface 37 is relatively low because there is not the additional surface area per unit length encountered with a thread. Also, since there is no cutting action of thread against rubber, relatively little heat is generated. For these reasons it is not necessary to use a lubricant in the assembly of the hose coupling. A lubricant may however be used to further simplify assembly of the coupling.

As seen in FIG. 3, the advance of nipple 10 into hose 34 is limited by annular ring 18. The number of threads 16 on nipple 10 is approximately the same but not more than the number of threads 32 in female threaded length 30 of collar 22. When full mating engagement of these threads is achieved, annular ring 18 abuts against the outer surface 43 of collar 22 and no further advance of nipple 10 is permitted. This automatic stop, in addition to preventing contact of threads 16 with inner surface 37 of hose 34, automatically gauges the gap between outer surface 43 of collar 22 and swivel nut flange 38 of nut 36. This prevents contact of outer surface 45 of flange 38 with outer surface 43 of collar 22 and locked or improperly rotatable couplings are not obtained.

The hose coupling of this invention can be made in a range of sizes and can be applied to any type of rubber or plastic hose. The coupling is tighter than couplings wherein a threaded length on the nipple is threaded against the inner surface of the hose. This follows since the radial compressive force between length 14, which is of constant diameter, and collar 22, is greater than it would be if threads were cut into length 14. There is more sealing pressure if there is no thread recess into which the rubber can expand. With the hose coupling described there is no cutting and stressing of the inner wall of the hose, the conduit is not contaminated with burrs of hose, lubrication of the threads is optional and the gap between the swivel nut and the hose collar is automatically gauged. The hose couplings are assembled with less force than is required with conventional couplings and the problem of heat generation is not as severe. If annular ring 18 is of a greater diameter and if it is provided with at least two flat surfaces for gripping with a torque producing tool such as a wrench, the couplings of this invention can be easily assembled. One way to reduce the friction and the amount of work therefore required to assemble the coupling, is to coat the tapered length 12 and straight length 14 of nipple 10 with Teflon. The invention applies broadly to hose fittings and finds specific application in reusable hose fittings.

What is claimed is:

1. A one-piece nipple for use in a hose coupling assembly including the elements of: an external taper at the end of said nipple for easing entry thereof into a hose; a length adjacent to said taper having a smooth, flat, external surface of constant diameter, adapted to press firmly against the inside surface of a hose without damaging it; a plurality of full threads adjacent to said smooth flat length and further remote from said end; an annular ring of constant diameter adjacent to said threads and still further remote from said end, having a diameter slightly greater than said threads; and an annular stepped shoulder adapted to retain a swivel nut in a freely rotatable position with the opening at one end of the swivel nut being spaced radially outwardly further than the outer periphery of said annular ring when seated on said shoulder said stepped shoulder being adjacent to said annular ring and further remote from said end.

2. A hose coupling including the elements of: (1) an annular collar for a hose having grooved means at one end thereof to firmly grip a hose end and position it against an annular shoulder of said collar; and a female threaded length adjacent to said hose gripping means; and (2) a one-piece nipple having an external taper at the end thereof for easing its entry into a hose positioned in said collar; a length adjacent to said taper having a smooth, flat, external surface of constant diameter adapted to press firmly against the inside surface of a hose positioned in said collar without damaging it; a plurality of full threads adjacent to said smooth, flat external surface and further remote from said end, said threads engaging the threads in said collar; and an annular ring of constant diameter adjacent to said threads and still further remote from said end, having a diameter slightly greater than said threads, and so positioned on said nipple as to abut said collar and prevent the threads of said nipple from passing beyond the threaded length of said collar, said nipple further including an annular stepped shoulder adapted to retain a swivel nut in freely rotatable position with the opening at one end of the swivel nut being spaced radially outwardly further than the outer periphery of said annular ring when seated on said shoulder, and said stepped platform being most remote from said end.

* * * * *